June 28, 1949.    M. J. SMIES    2,474,598
AUTOMATIC BRAKE SETTING AND CLUTCH RELEASE
CONTROL MECHANISM FOR TRACTORS
Filed Oct. 18, 1947
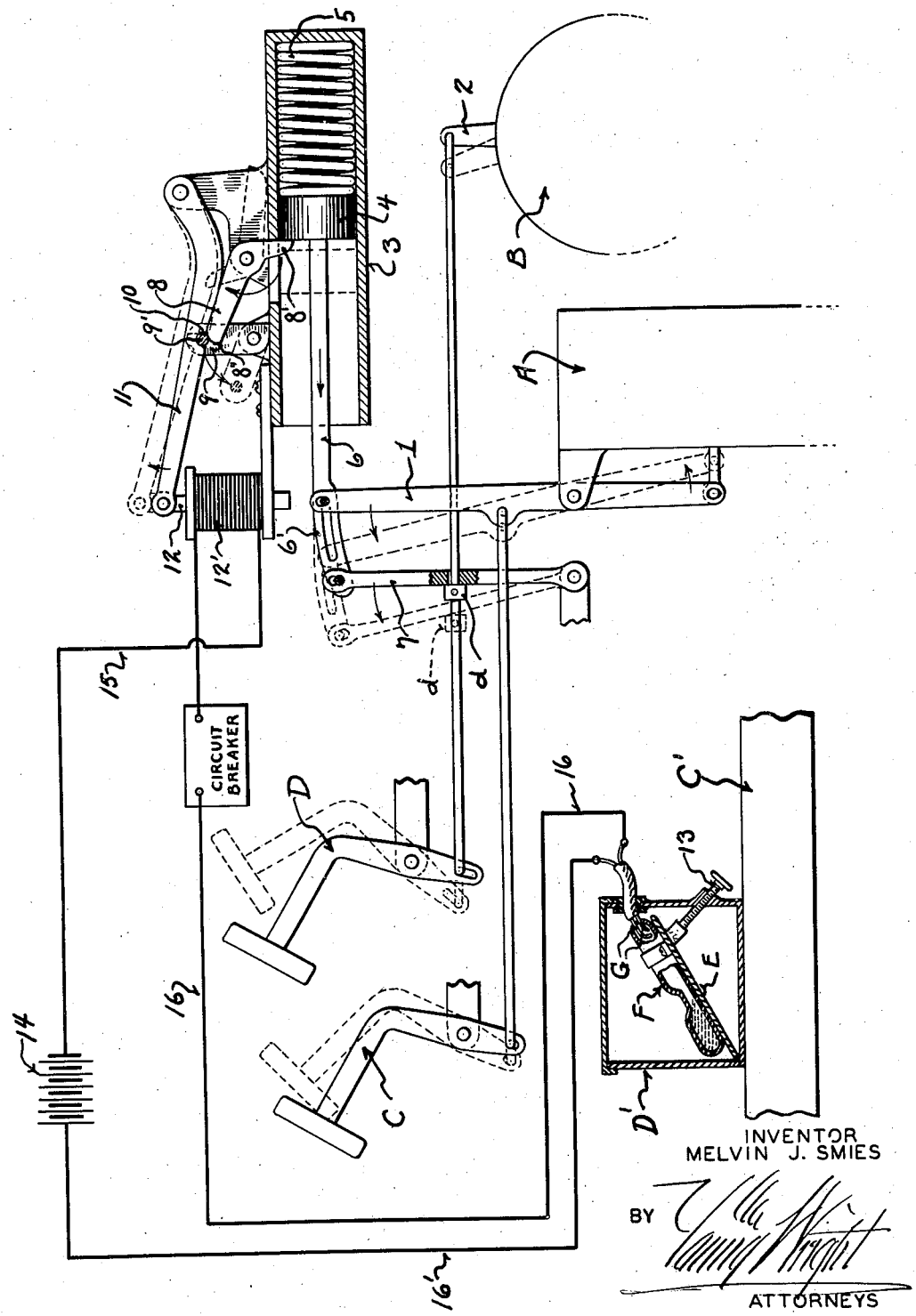
INVENTOR
MELVIN J. SMIES
BY
ATTORNEYS Patented June 28, 1949

2,474,598

UNITED STATES PATENT OFFICE 2,474,598

AUTOMATIC BRAKE SETTING AND CLUTCH RELEASE CONTROL MECHANISM FOR TRACTORS

Melvin J. Smies, Sheboygan, Wis.

Application October 18, 1947, Serial No. 780,716

1 Claim. (Cl. 180—82)

My invention refers to a safety device for tractors such, for example, as disclosed in my pending patent application, Serial No. 724,101, now Patent No. 2,456,799, issued Dec. 21, 1948.

The primary object of my invention is to provide automatic gravity controlled means for closing an electric circuit, whereby the clutch of a tractor is disconnected and the brakes thereof are set to eliminate the tendency of a tractor to rear backward under certain conditions.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

The drawing illustrates a diagrammatic view of a gravity controlled mechanism embodying the features of my invention.

Referring by characters to the drawing, A indicates a tractor clutch and B the brake or brakes. C is a manually controlled clutch pedal and D a manually controlled brake pedal.

The clutch pedal is linked to a clutch actuating lever 1, and 2 a brake lever in link connection with the brake pedal D, which are of standard type.

Reference numeral 3 indicates a cylindrical housing having mounted therein a piston 4, between which piston and the closed end of the housing there is interposed a power spring 5. The piston 4 carries a piston rod 6, the head end 6' of which is provided with a slot radially disposed with reference to the pivot point of the clutch lever 1. The head 6' of the piston rod has connected thereto a rock arm 7, which rock arm is pivoted to any part of the tractor frame.

The power spring is loaded by manually pushing in the piston rod 6, and when so loaded the spring power is stored by a lock and release trigger 8 pivoted to the housing 3 and having a tail piece 8' extending into the housing and in engagement with the piston. In this exemplification of the lock and release means I provide a pivoted tumbler 9, which tumbler carries a lug 9' that engages the crowned end 8" of the trigger, whereby the same is held in its locked position.

The lug 9' of the trigger, is in turn secured in its position by engagement with a socket 10 forming part of a pivoted magnet controlled lever 11, the same being adapted to swing in vertical position.

The end of the magnet control lever is shackled to the core 12 of a solenoid 12', all of which parts are shown conveniently attached to the housing.

A horizontally positioned part of the tractor frame C' has secured thereto a casing D' having mounted therein an angular plate E, upon which plate is mounted a switch tube F having a volume of mercury in its lower end. The upper end of the tube carries a pair of spaced electric conductors G. The mercury switch so positioned is adapted to make connections between the conductors G when the tractor has assumed a dangerous angular position.

In order to adjust the angle, whereby the switch closes the contact points, I provide a means for adjusting said angle of the mercury switch, and said means comprises an adjusting screw 13 in threaded union with the casing D', and said screw end engages the free end of the angle plate E.

The solenoid 12' is in circuit with a battery or generator 14 by means of conductor wires 15, 16, and 16', which wires are attached to the conductors G and back to the battery, whereby the circuit to the solenoid 13 is broken at the mercury switch when the tractor is in a normal safe plane.

The link connection between the brake B and brake pedal D carries a trip collar d, which collar is engaged by the rock arm 7 when the power spring is released, whereby the brake or brakes B are set, as indicated in dotted lines.

It is apparent in full lines shown on the diagram, that the clutch and brake may be manually operated to selectively control said clutch and brake in the usual manner. This independent manual control is affected due to the fact that the collar D is free to travel forwardly and also the lever 1, which lever will rock at its upper end in the arced slot of the piston rod head 6'.

In the event that the tractor assumes an abnormal or dangerous angle the switch F, which is of the gravity type, will close the electric circuit through the conductor wires G—G, whereby the solenoid is energized and its core will raise the lever 11 to free the tumbler lug 9' from its locked position with relation to the trigger 8. The power spring 5 is thus freed from its loaded position, whereby the piston and its rod will move forward and thus actuate the levers 1 and 7, whereby the clutch is released and the brakes are set simultaneously. Thus, the tractor being relieved of its propulsion power will drop back upon the ground, whereby tilting backwardly is avoided.

I claim:

In a tractor having a manually controlled lever actuated clutch and a manually controlled lever actuated brake; automatic means for throwing out the clutch and setting the brake when the tractor assumes a predetermined angle, comprising a housing, a piston reciprocatively mounted in the housing, a compressible coil spring interposed between the piston and housing end, a trigger for locking the piston when the same is under its spring tension, a rock arm and an actuating lever connected to the piston and the manually controlled clutch and brake levers, a magnet for releasing the trigger, an electric circuit connecting the magnet and an angularly disposed mercury switch in the electric circuit for normally breaking the circuit, when the tractor is at a safe longitudinally disposed angle, the mercury switch being adapted to close the circuit when the tractor is tilted rearwardly at an abnormal angle, whereby the tractor brake and clutch are set.

MELVIN J. SMIES.

REFERENCES CITED

The following references are of record in the file of this patent:

UNITED STATES PATENTS

| Number | Name | Date |
|---|---|---|
| 1,811,484 | Westlund | June 23, 1931 |
| 1,901,554 | De Wilde | Mar. 14, 1933 |
| 2,192,262 | Griesedieck | Mar. 5, 1940 |
| 2,208,016 | Cowles | July 16, 1940 |